US012724989B2

(12) United States Patent
Sakek et al.

(10) Patent No.: US 12,724,989 B2
(45) Date of Patent: Sep. 1, 2026

(54) SMART HEADPHONE WITH REAL-TIME PROBLEMATIC CONTENT MODERATION CAPABILITY

(71) Applicants: Mohamed Sakek, Salwa (KW); Rami Abu Jaber, Adan (KW); Ruba Skaik, Nepean (CA); Ahmed Skaik, Salwa (KW)

(72) Inventors: Mohamed Sakek, Salwa (KW); Rami Abu Jaber, Adan (KW); Ruba Skaik, Nepean (CA); Ahmed Skaik, Salwa (KW)

( * ) Notice: Subject to any disclaimer, the term of this patent is extended or adjusted under 35 U.S.C. 154(b) by 166 days.

(21) Appl. No.: 18/830,764

(22) Filed: Sep. 11, 2024

(65) Prior Publication Data

US 2026/0073161 A1 Mar. 12, 2026

(51) Int. Cl.
*G06F 40/58* (2020.01)
*G06Q 50/26* (2012.01)

(52) U.S. Cl.
CPC .......... *G06F 40/58* (2020.01); *G06Q 50/265* (2013.01)

(58) Field of Classification Search
None
See application file for complete search history.

(56) References Cited

U.S. PATENT DOCUMENTS 6,462,500 B1 * 10/2002 L'Hegarat ............. A61G 13/02 318/649
9,454,957 B1 * 9/2016 Mathias ................ G06F 40/295
11,102,344 B1 * 8/2021 Buentello ........... G10L 15/1822
11,250,515 B1 * 2/2022 Feiteira .................. G06Q 40/08
12,562,171 B1 * 2/2026 Kockerbeck ............ G10L 17/22
2004/0143438 A1 * 7/2004 Cabezas .................. G10L 21/00 704/260
2004/0162726 A1 * 8/2004 Chang ...................... G10L 17/26 704/E17.015
2008/0300877 A1 * 12/2008 Gilbert ................... G06Q 20/40 704/E15.001
2016/0119713 A1 * 4/2016 Knox ................... G06V 20/593 381/71.1
2017/0193531 A1 * 7/2017 Fatourechi ......... G06Q 30/0201
2019/0230170 A1 * 7/2019 Marlin ................ G06F 16/9535
2020/0075020 A1 * 3/2020 Howard .................. G06F 40/30
(Continued)

*Primary Examiner* — Peter Vincent Agustin

(57) ABSTRACT

A system, method and computer-readable medium for real-time problematic content moderation is disclosed. The method includes receiving audio data via a headphone worn by a user, wherein the headphone is connected with an electronic device using which the user is in communication with an individual. The method also includes transmitting the audio data to a microprocessor of the headphone. The method further includes generating transcript of audio data using speech-to-text algorithm. The method includes automatically detecting if the transcript comprises problematic content using AI content moderating algorithm. The method also includes profiling the voice of the individual delivering problematic content, using audio manipulating algorithm. The method further includes automatically blocking the voice of the individual, using one or more audio processing libraries, when the individual further communicates with user. The method includes simultaneously notifying a caretaker about problematic content via a mobile application of a smart device of caretaker.

25 Claims, 5 Drawing Sheets

(56) References Cited

U.S. PATENT DOCUMENTS

2020/0162509 A1* 5/2020 Ballot ................. H04L 63/1425
2022/0124407 A1* 4/2022 Grover ................... G06V 20/46
2023/0014321 A1* 1/2023 Nair ........................ G10L 25/51

* cited by examiner

SMART HEADPHONE WITH REAL-TIME PROBLEMATIC CONTENT MODERATION CAPABILITY

FIELD OF THE INVENTION

The present invention relates to problematic content moderation technique and more particularly relates to smart headphone with real-time problematic content moderation capability.

BACKGROUND OF THE INVENTION

The proliferation of digital communication, online gaming, and immersive virtual environments has significantly transformed the way people, especially children and young users, interact and engage with technology. While these advancements have brought about many benefits, they have also introduced new challenges in safeguarding users, particularly children, from exposure to harmful and problematic content.

Users, especially young users, often utilize headphones for various forms of communication, such as voice calls, video calls, and game-related interactions. During these activities, users may be exposed to a wide range of problematic content, including but not limited to bullying, cyberbullying, abusive language, hate speech, allegations, sexual advances, suicidal ideation, and financial frauds. Exposure to such content can have severe negative impacts on the user's mental health, emotional well-being, and overall development.

Existing content moderation solutions typically operate at the application or platform level, relying on post-processing of textual data to detect and flag problematic content. These methods pose various shortcomings, such as lack of real-time moderation, platform-specific implementation, limited caretaker involvement, and inability to provide comprehensive protection across all communication channels and gaming interactions.

The mental well-being of children and young users is vital, as exposure to harmful content can lead to long-lasting psychological and emotional trauma. Traditional content moderation approaches lack in addressing the unique needs and vulnerabilities of this user demographic, while leaving them susceptible to the detrimental effects of problematic content.

Hence, here is a need for a solution that proactively detects and mitigates problematic content in real-time, while also allowing caretakers to seamlessly monitor and safeguard the users'well-being effectively. Such a solution should integrate seamlessly with the devices and platforms commonly used by children and young users, providing a secure and accessible means of protection.

BRIEF SUMMARY OF THE INVENTION

It is an object of the present invention to provide a method and system for detecting and moderating problematic content in audio data received via a headphone connected to an electronic device or gaming platform.

It is another object of the present invention to utilize speech-to-text conversion and artificial intelligence (AI) based content moderation capabilities integrated directly within the headphone to automatically detect and block problematic content in real-time.

It is a further object of the present invention to notify a caretaker about the detected problematic content via a mobile application, allowing the caretaker to take appropriate actions to protect the user, particularly young users, from harmful content.

It is yet another object of the present invention to provide a comprehensive and accessible solution for protecting users across a wide range of electronic devices and gaming platforms, without the need for complex software integration or deployment on each individual device or platform.

It is an additional object of the present invention to enable the caretaker to configure the system to automatically block problematic content or receive notifications, based on their preferences, through the integration of the caretaker's mobile application.

It is another object of the present invention to safeguard users, particularly children, from a broad range of online threats and harmful content, including bullying, threats, sexual abuse, financial frauds, and other problematic material.

It is a further object of the present invention to store the audio data, textual data, and moderation actions taken in a database for record-keeping and future analysis purposes.

According to an embodiment of the present invention, a method for real-time problematic content moderation is disclosed. The method includes receiving audio data via a headphone worn by a user, wherein the headphone is connected with an electronic device using which the user is in communication with an individual. The method also includes transmitting the audio data to a microprocessor of the headphone. The method further includes generating transcript of the audio data using speech-to-text algorithm, the speech-to-text algorithm being embedded in the microprocessor. The method includes automatically detecting if the transcript comprises problematic content using an artificial intelligence (AI) content moderating algorithm, the AI content moderating algorithm being embedded in the microprocessor. The method also includes upon detecting the problematic content in the transcript, profiling the voice of the individual delivering problematic content, using audio manipulating algorithm. The method further includes based on the profiling, automatically blocking the voice of the individual, using one or more audio processing libraries, when the individual further communicates with the user. The method includes simultaneously notifying a caretaker about the problematic content via a mobile application of a smart device of the caretaker.

According to another embodiment of the present invention, a system comprising a processor and memory is disclosed, wherein the processor and the memory in combination are operable to implement a method. The method includes receiving audio data via a headphone worn by a user, wherein the headphone is connected with an electronic device using which the user is in communication with an individual. The method also includes transmitting the audio data to a microprocessor of the headphone. The method further includes generating transcript of the audio data using speech-to-text algorithm, the speech-to-text algorithm being embedded in the microprocessor. The method includes automatically detecting if the transcript comprises problematic content using an artificial intelligence (AI) content moderating algorithm, the AI content moderating algorithm being embedded in the microprocessor. The method also includes upon detecting the problematic content in the transcript, profiling the voice of the individual delivering problematic content, using audio manipulating algorithm. The method further includes based on the profiling, automatically blocking the voice of the individual, using one or more audio processing libraries, when the individual further communicates with the user. The method includes simultaneously notifying a caretaker about the problematic content via a mobile application of a smart device of the caretaker.

According to further embodiment of the present invention, a non-transitory computer-usable medium having computer-readable program code embodied therein is disclosed. The computer-readable program code is adapted to be executed to implement a method. The method includes receiving audio data via a headphone worn by a user, wherein the headphone is connected with an electronic device using which the user is in communication with an individual. The method also includes transmitting the audio data to a microprocessor of the headphone. The method further includes generating transcript of the audio data using speech-to-text algorithm, the speech-to-text algorithm being embedded in the microprocessor. The method includes automatically detecting if the transcript comprises problematic content using an artificial intelligence (AI) content moderating algorithm, the AI content moderating algorithm being embedded in the microprocessor. The method also includes upon detecting the problematic content in the transcript, profiling the voice of the individual delivering problematic content, using audio manipulating algorithm. The method further includes based on the profiling, automatically blocking the voice of the individual, using one or more audio processing libraries, when the individual further communicates with the user. The method includes simultaneously notifying a caretaker about the problematic content via a mobile application of a smart device of the caretaker.

BRIEF DESCRIPTION OF DRAWINGS

The present invention will become clearly understood to those of ordinary skill in the art when descriptions of exemplary embodiments thereof are read with reference to the accompanying drawings.

DETAILED DESCRIPTION OF THE INVENTION

The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention. For a more complete understanding of the present invention, reference is now made to the following descriptions taken in conjunction with the accompanying drawings.

The term "artificial intelligence" or AI used in this disclosure typically refers to "machine intelligence" that includes a computer model, algorithm or simulation of human intelligence processes by machines, such as computer systems to learn, predict, analyze and provide actionable insight, and/or control actuators. The AI may be a machine learning algorithm, wherein the machine learning algorithm may include a trained machine learning algorithm. Typically, the machine learning algorithm may be trained using supervised, semi-supervised, unsupervised or reinforcement learning techniques which includes neural networks and support vector machines.

Figure 1:
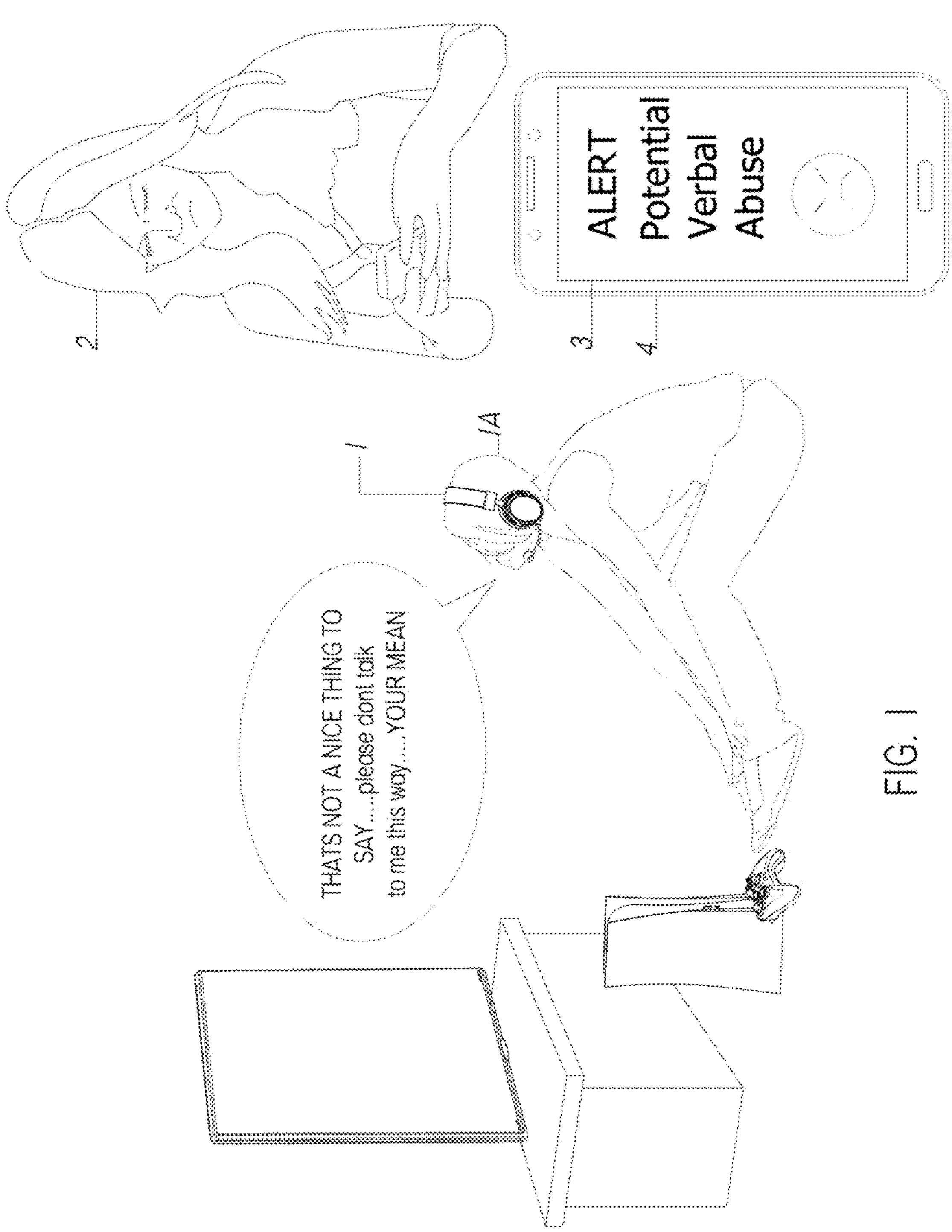
FIG. 1 is a schematic view of the present invention.

FIG. 1 shows a schematic view of an embodiment of the invention in use with a user 1 wearing a headphone 1A and a guardian 2 receiving an alert 3 on mobile device 4 informing the guardian that potential bullying is taking place. The headphones 1A having a microcontroller with onboard memory and wireless transmission capabilities that record and transmit voice information to a cloud network. Algorithms detecting any problematic content via artificial intelligence (AI) algorithms notifies guardian depending on the classification of problematic content and having representative icons forwarded with the aforementioned alert.

Figure 2:
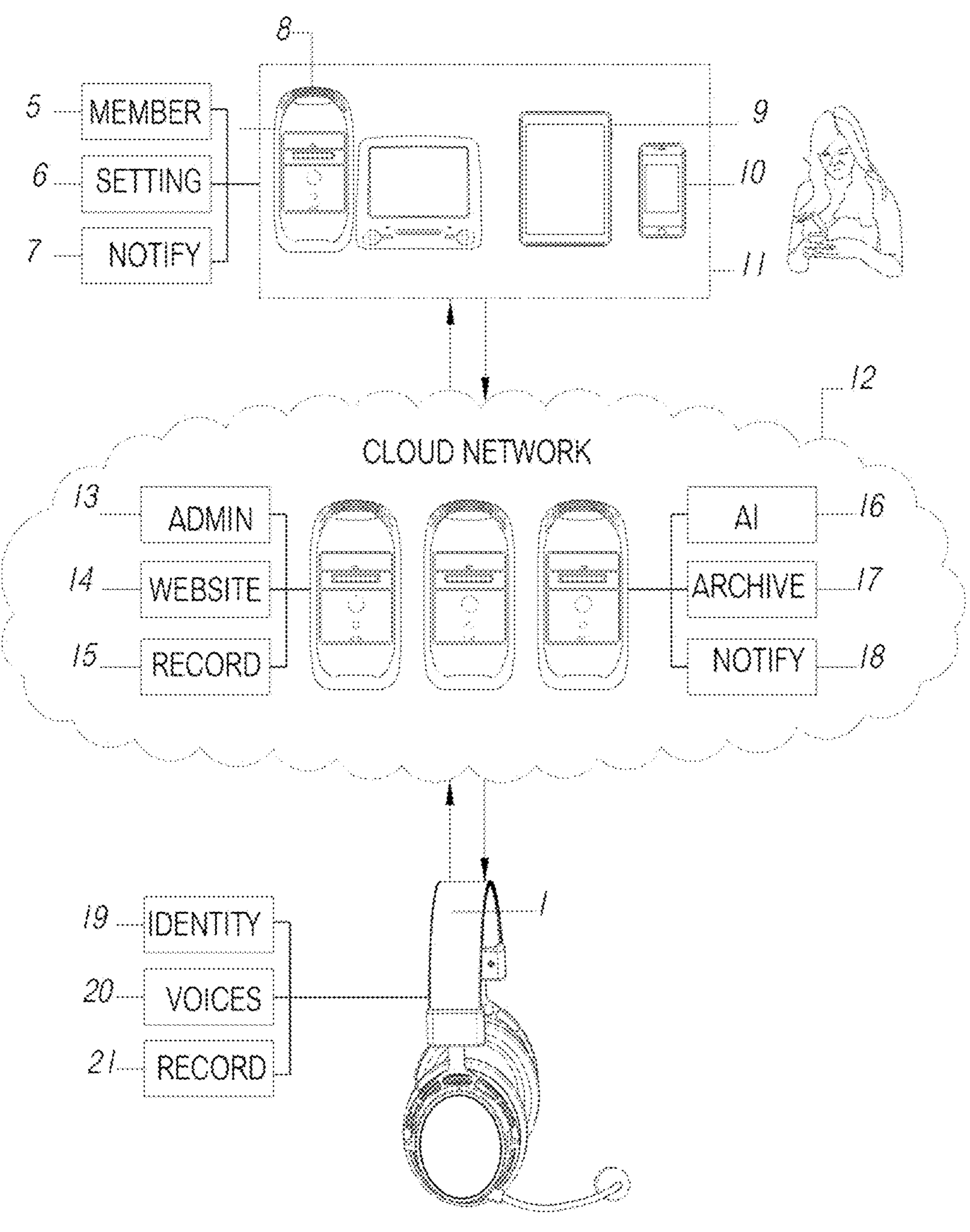
FIG. 2 depicts another schematic view of the present invention.

FIG. 2 showing the logistics operations with users having access to functions such as but not limited to membership functions 5, such as contact information, subscription payments, notification preferences, settings 6 such as conversation alert thresholds, and notifications 7. The software also being compatible with a plurality of operating systems such as, but not limited to: Windows Apple and Android and compatible with a multitude of hardware platforms 11 including, but not limited to: personal desktops 8, laptops, tablets 9, smartphones 10 and the like. The figure showing headphones 1 having functions including but not limited to: sharing parties'identities 19, transmitting voice files 20 and recording voices 21 while being connected to a plurality of devices such as but not limited to Microsoft XBOX, Sony Play Station, and various social chat programs etc.

FIG. 2 also showing headphones 1 and third parties connected by means of cloud network 12. The cloud network 12 having algorithms and routine operations such as but not limited to: administrative services 15 including subscriptions, user demographics, headphone registrations; online payments; website 14 such as backend management, voice data accounts; recording settings and thresholds 15 such as language type, tone frequencies, trigger words; AI algorithms 16 that detect trends, compare data, and predict outcomes on historical data collected therein; digital voice archives 17 and notifications 18 such as emergency alerts, mood alerts via text messages SMS, email and the like. Those of skill in the art will recognize that mobile applications are written in several languages include, by way of non-limiting examples, C, C++, C #, Objective-C, Java, Javascript, Pascal, Object Pascal, Python, Ruby, VB.NET, WML, and XHL/HL with or without CSS, or combinations thereof. The application in invention is also compatible with a plurality of operating systems such as, but not limited to: Windows, Apple, and Android, and compatible with a multitude of hardware platforms such as, but not limited to: personal desktops, laptops, tablets, smartphones and the like. Suitable mobile application development environments are available from several sources. Commercially available development environments include, by way of non-limiting examples, AirplaySDK, alcheMo, Appcelerator, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android SDK, BlackBerry SDK, BREW SDK, Palm OS SDK, Symbian SDK, webOS SDK, and Windows Mobile SDK. Those of skill in the art will recognize that several commercial forums are available for distribution of mobile applications including, by way of non-limiting examples, Apple App Store, Google Play, Chrome Web Store, BlackBerry App World, App Store for Palm devices, App Catalog for webOS, Windows Marketplace for Mobile, Ovi Store for Nokia devices, Samsung Apps, and Nintendo DSi Shop.

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program.

Figure 3:
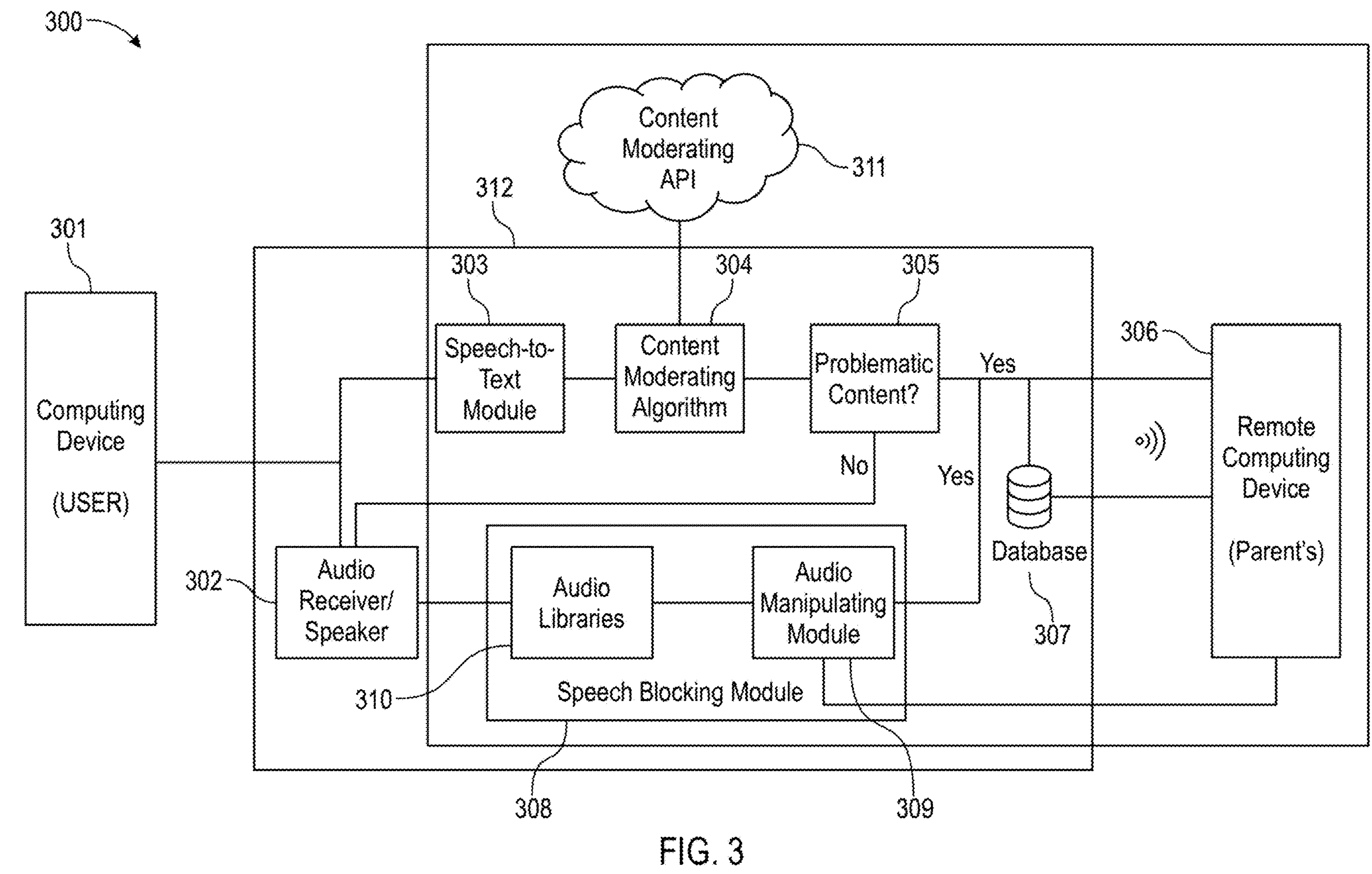
FIG. 3 is a block flow diagram of a system implemented according to an embodiment of the present invention.

According to an embodiment, the present invention is implemented as a system 300 for real-time problematic content moderation in audio data, which is shown as a block flow diagram in FIG. 3. The content moderation includes blocking or redacting the audio or the audio data. The system 300 detects, blocks, and notifies caretakers of problematic content in real-time. According to an embodiment, this system 300 is used in environments where content moderation is critical, such as in protecting vulnerable individuals from harmful or inappropriate communication during telephonic, gaming or online interactions. The term headphone can also be referred to any audio listening device such as headset.

In an exemplary embodiment, the system 300 includes a headphone. The headphone having a microprocessor that is equipped with a plurality of modules to monitor and manage audio communications. In one embodiment the microprocessor is a Raspberry Pi. The headphone is configured to connect wirelessly or via a wired connection to an electronic device 301. In one embodiment, the headphone is connected to the electronic device 301 by means of a smart connector. The electronic device 301 can be any device capable of running applications and connecting to the internet, including smartphones, tablets, gaming consoles, personal computers, or AR/VR devices.

The headphone includes an audio receiver 302, which may also be referred to as speakers, to receive the audio data during audio, video or gaming communication with an individual. As known in the prior arts, the headphone is typically built-in with microphones and speakers for voice and/or audio communication. The audio data may originate from various sources, including individuals in voice communication, players in game-related communication, or participants in video-based communication with the user. The system 300 further includes a speech-to-text module 303 integrated with microprocessor of the headphone. The speech-to-text module 303 is programmed with speech-to-text algorithm to convert audio data, received via the headphone, to transcript. In one aspect, the speech-to-text module 303 is configured to operate in real-time to ensure that the conversion of speech to text is real-time while also allowing for timely content moderation, i.e. redacting or blocking the audio. The system 300 also includes artificial intelligence (AI) content moderating algorithm 304, the content moderating algorithm 304 being embedded in the microprocessor. Once the speech-to-text module 303 generates transcript of the audio data, the AI content moderating algorithm 304 automatically analyzes the transcript to detect problematic content. Problematic content includes but is not limited to bullying, cyberbullying, abusive language, hate speech, allegations, sexual advances, suicidal ideation, and financial frauds. In one embodiment the AI algorithm 304 invokes cloud-based content moderating application programming interface (API) 311 to identify 305 the problematic content in the transcript.

The system 300 further includes a speech blocking module 308. The speech blocking module 308 includes an audio manipulating module 309 and one or more audio libraries 310. Upon detection 305 of problematic content by the AI algorithm 304, the audio manipulating module 309 is activated. The audio manipulating module 309 being programmed with audio manipulating algorithm in the microprocessor. The audio manipulating module 309 processes the audio data in real-time and profiles the voice of the individual delivering problematic content, using audio manipulating algorithm. The audio manipulating module 309 is referred to as a digital audio workstation (DAW) which is configured for profiling the voice of the individual. The audio processing library 310 is configured in the speech blocking module 308 to mute or redact the voice of the user delivering the problematic content. In a specific aspect of the invention, the DAW is implemented as programmed code for processing audio data. The processing includes analyzing the audio data. In present invention, DAW may be any software including but not limited to Audacity, Reaper, Pro Tools and Ableton. The audio library 310 includes but not limited to Sound eXchange (SoX) and PyDub.

Figure 4:
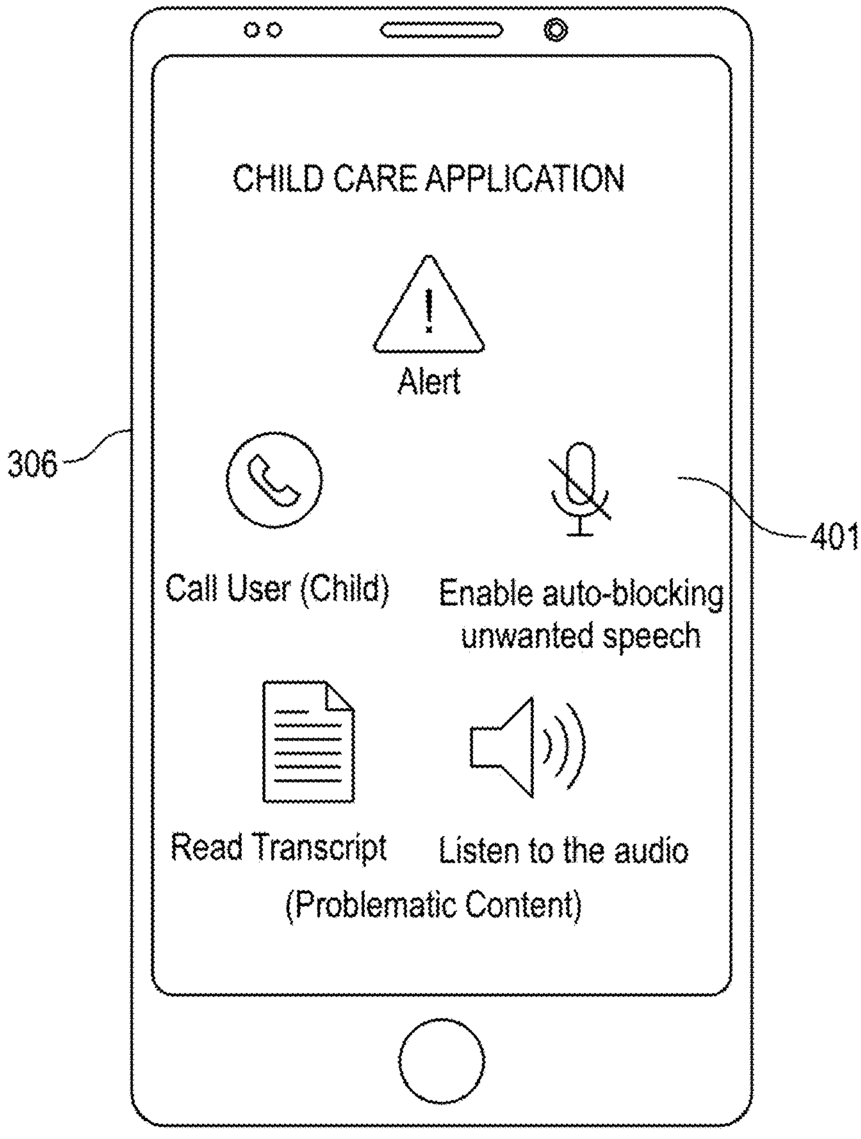
FIG. 4 is a schematic view of a caretaker's mobile application.

Further, the system 300 includes a mobile application installed in a mobile device 306 of a caretaker. The caretaker can be anyone including a parent or a guardian to the user. The system 300 is programmed to notify a caretaker via the mobile application 401 when problematic content is detected, as shown in FIG. 4. The application 401 allows the caretaker to configure settings, such as enabling or disabling automatic blocking of problematic content. If automatic blocking is enabled in the mobile application 401, the voice of the individual delivering problematic content is in real-time using the speech blocking module 308. The caretaker further receives an alert notification on the mobile device 306 which provides a plurality of options to take actions upon detecting the problematic content. The actions include listening to or reading the problematic content and calling the user of the electronic device 301 directly from the application 401. In one aspect, the caretaker receives notifications through the mobile application 401, which are displayed as a plurality of action icons as shown in FIG. 4. These icons allow the caretaker to listen to the problematic content, read the text version, or initiate a call to the user.

The system 300 further includes a database 307 that stores the audio data, converted transcript, problematic content stamped with date and time, and any moderation actions taken. This data can be used for reviewing past interactions, improving the AI algorithm 304, or providing evidence in case of disputes. The database 307 is securely managed to protect the privacy of the user while allowing authorized access by the caretaker.

The system described above can be implemented using various hardware and software configurations. The system may be constructed using specialized hardware designed for problematic content management, or it may utilize general-purpose computers configured with specific software to perform the required functions.

The invention can be embodied entirely in hardware, entirely in software, or as a combination of both hardware and software elements. In some implementations, the system may be primarily software-based, including components such as firmware, resident software, and microcode running on standard computing hardware.

The system can be distributed as a computer program product, accessible from a computer-usable or computer-readable medium. This medium could be any apparatus capable of storing, communicating, or transporting the program for use by or in connection with a computer or instruction execution system. Examples of such media include various types of disks (floppy disks, optical disks, CD-ROMs, magnetic disks), read-only memories (ROMs), random access memories (RAMs), EPROMs, EEPROMs, magnetic or optical cards, flash memories including USB keys, or any other suitable storage device.

A typical data processing system suitable for running the problematic content management software would include at least one processor connected to memory elements through a system bus. The memory elements may include local memory for program execution, bulk storage for problematic content data, and cache memories to improve performance. The system would also incorporate input/output devices such as keyboards, displays, and pointing devices, either directly connected or through I/O controllers. The system is not limited to any particular programming language or computer platform. It can be implemented using various programming languages and run on different types of computer systems as needed.

Figure 5:
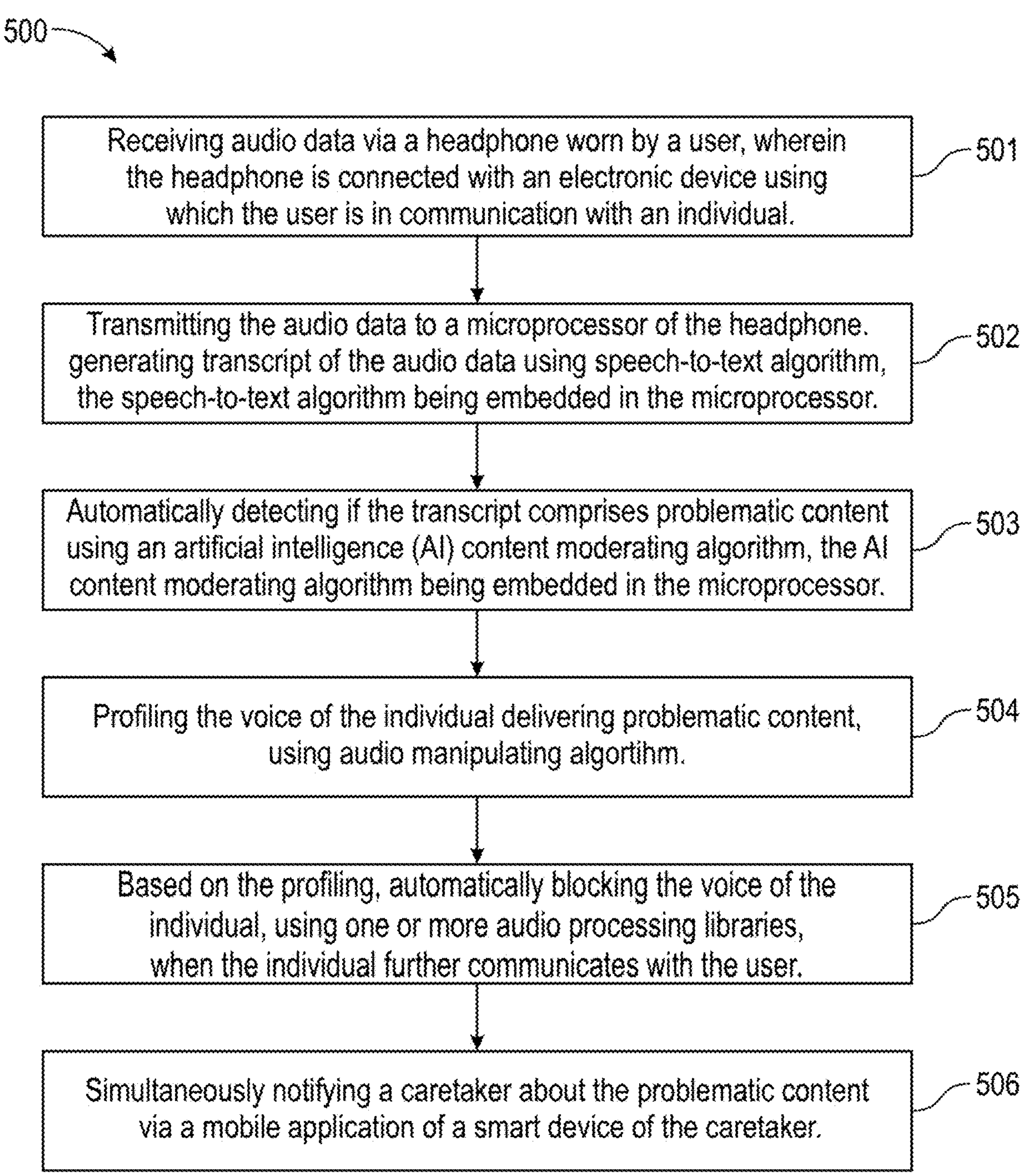
FIG. 5 is a flowchart illustration a method implemented according to an embodiment of the present invention.

According to another exemplary embodiment of the present invention, a method 500 of real-time problematic content moderation for headphone-connected devices is disclosed as shown in FIG. 5. The method is implemented using the system as discussed referring FIG. 3. At block 501, the system receives audio data via a headphone worn by a user and connected with an electronic device of the user, wherein the electronic device is in communication with an individual. The audio data may originate from various sources, including individuals in voice communication, players in game-related communication, or participants in video-based communication with the user. The electronic device can be any device capable of running applications and connecting to the internet, including smartphones, tablets, gaming consoles, personal computers, or AR/VR devices.

At block 502, the audio data is transmitted to a microprocessor of the headphone.

At block 503, the transcript of the audio data is generated, in real-time, using speech-to-text algorithm. The conversion is necessary for enabling text-based analysis by the AI content moderating algorithm.

At block 504, the AI content moderating algorithm automatically analyzes the transcript to detect any problematic content. The algorithm is trained to identify specific types of problematic or harmful content, including but not limited to bullying, abusive language, and financial fraud. The AI algorithm is embedded within the headphone and invokes cloud-based content moderating application programming interface (API) to identify the problematic content in the textual data.

At block 505, if the transcript is detected to be comprising problematic content, the voice of the individual delivering problematic content profiled, using audio manipulating algorithm.

At block 506, based on the profiling step, the voice of the individual is automatically blocked, using one or more audio processing libraries, when the individual further communicates with the user. Blocking includes muting or redacting the problematic portions of the audio data to prevent the user from hearing it. The audio manipulating algorithm processes the audio data in real-time and manipulates the voice of the individual. The audio manipulating algorithm may be integrated in a digital audio workstation (DAW) which is configured for profiling the voice of the individual. An audio processing library to mute or redact the voice of the user delivering the problematic content. In present invention, DAW may be any software including but not limited to Audacity, Reaper, Pro Tools and Ableton whereas the audio library includes but not limited to Sound eXchange (SoX) and PyDub.

At block 507, the caretaker is simultaneously notified about the detection of problematic content via a mobile application of caretaker's user device. In one aspect, the caretaker receives notifications through the mobile application, which are displayed as a plurality of action icons. These icons allow the caretaker to listen to the problematic content, read the text version, or initiate a call to the user. The data related to the interaction, including the original audio data, converted textual data, problematic content stamped with date and time, and any moderation actions taken, is stored securely in a database. This data is accessible by authorized individuals for review or further analysis.

In specific embodiment, the voice of the individual is blocked if the caretaker enabled the option, in the mobile application, to automatically block problematic content.

The system is applicable in various scenarios, including (i) monitoring and controlling, by the parents, the type of content their children are exposed to during online interactions, especially in gaming and social media environments; (ii) caretakers of elderly individuals may use the system to protect them from scams, abusive language, or other harmful content during phone or video calls; (iii) in educational environments, the system can ensure that students are not exposed to inappropriate content during online learning sessions or peer communications.

Therefore, the disclosed system provides an effective, real-time solution for detecting, blocking, and notifying caretakers of problematic content during audio communications. By integrating AI algorithms, speech-to-text conversion, and speech blocking technologies within a user-friendly headphone and mobile application, the system provides enhanced protection and safety to caretakers and users alike. The invention is particularly beneficial in safeguarding vulnerable populations, such as children and the elderly, from harmful online interactions.

The advantages include (i) by integrating the speech-to-text conversion and AI-based content analysis capabilities directly within the headphone device, the invention is able to detect and mitigate problematic content in real-time, such that the user's exposure to harmful material is eliminated and ensures a seamless, uninterrupted gaming or communication experience, (ii) the headphone-centric design of the invention allows for easily deployable solution that may be used across a wide range of electronic devices and gaming platforms, without the need for complex software integration or distribution on each individual platform, (iii) the integration of the caretaker's mobile application provides a centralized interface for monitoring, configuring, and responding to detected problematic content. Caretakers may enable automatic content blocking or receive real-time notifications, allowing them to take immediate and appropriate actions to protect the user, particularly young users, from online threats and harmful content, (iv) by embedding the content moderation algorithm within the headphone, the invention enables monitoring and moderating problematic content across all communication and gaming interactions the user engages in while safeguarding against a wide range of online threats, including bullying, threats, sexual abuse, financial frauds, and the like. This ensures that users, especially children, are protected regardless of the communication or gaming context they are participating in.

It will finally be understood that the disclosed embodiments are presently preferred examples of how to make and use the claimed invention, and are intended to be explanatory rather than limiting the scope of the invention as defined by the claims below. Reasonable variations and modifications of the illustrated examples in the foregoing written specification and drawings are possible without departing from the scope of the invention as defined in the claim below. It should further be understood that to the extent the term "invention" is used in the written specification, it is not to be construed as a limited term as to number of claimed or disclosed inventions or the scope of any such invention, but as a term which has long been conveniently and widely used to describe new and useful improvements in technology. The scope of the invention supported by the above disclosure should accordingly be construed within the scope of what it teaches and suggests to those skilled in the art, and within the scope of any claims that the above disclosure supports. The scope of the invention is accordingly defined by the following claims.

This application is intended to cover any adaptations or variations of the present invention. Therefore, it is manifestly intended that this invention be limited only by the claims and the equivalents thereof.

The invention claimed is:

1. A method comprising:

receiving audio data via a headphone worn by a user, wherein the headphone is connected with an electronic device using which the user is in communication with an individual;

transmitting the audio data to a microprocessor of the headphone;

generating transcript of the audio data using speech-to-text algorithm, the speech-to-text algorithm being embedded in the microprocessor;

automatically detecting if the transcript comprises problematic content using an artificial intelligence (AI) content moderating algorithm, the AI content moderating algorithm being embedded in the microprocessor;

wherein upon detecting the problematic content in the transcript:

profiling the voice of the individual delivering problematic content, using audio manipulating algorithm;

based on the profiling, automatically blocking the voice of the individual, using one or more audio processing libraries, when the individual further communicates with the user; and simultaneously notifying a caretaker about the problematic content via a mobile application of a smart device of the caretaker.

2. The method of claim 1, wherein audio data is the audio data of the individual in voice communication with the user, a player in game-related communication with the user, or a video caller in video communication with the user.

3. The method of claim 1, the problematic content includes bullying, cyberbullying, abusive, hate speech, allegations, sexual advances, suicidal ideation and financial frauds.

4. The method of claim 1, wherein the content moderating algorithm invokes a cloud-based content moderating application programming interface (API) to automatically detect problematic content in the transcript.

5. The method of claim 1, wherein the notifying includes sending the detected problematic content, as audio data and transcript, stamped with date and time to the mobile application.

6. The method of claim 1 further comprising allowing the caretaker to perform one or more actions including at least one of: listening to the problematic content, reading the transcript containing problematic content, and calling the user of the electronic device.

7. The method of claim 1, wherein the blocking includes muting or redacting the voice of the individual.

8. The method of claim 1 further comprising enabling or disabling the automatically blocking step via the mobile application.

9. A non-transitory computer-readable storage medium having computer-executable instructions embodied thereon, wherein, when executed by a processor, the computer-executable instructions cause the processor to:

receiving audio data via a headphone worn by a user, wherein the headphone is connected with an electronic device using which the user is in communication with an individual;

transmitting the audio data to a microprocessor of the headphone;

generating transcript of the audio data using speech-to-text algorithm, the speech-to-text algorithm being embedded in the microprocessor;

automatically detecting if the transcript comprises problematic content using an artificial intelligence (AI) content moderating algorithm, the AI content moderating algorithm being embedded in the microprocessor;

wherein upon detecting the problematic content in the transcript:

profiling the voice of the individual delivering problematic content, using audio manipulating algorithm;

based on the profiling, automatically blocking the voice of the individual, using one or more audio processing libraries, when the individual further communicates with the user; and simultaneously notifying a caretaker about the problematic content via a mobile application of a smart device of the caretaker.

10. The non-transitory computer-readable storage medium of claim 9, wherein the audio data is the audio data of the individual in voice communication with the user, a player in game-related communication with the user, or a video caller in video communication with the user.

11. The non-transitory computer-readable storage medium of claim 9, wherein the problematic content includes bullying, cyberbullying, abusive, hate speech, allegations, sexual advances, suicidal ideation and financial frauds.

12. The non-transitory computer-readable storage medium of claim 9, wherein the computer executable instructions further cause the processor to:

invoke a cloud-based content moderating application programming interface (API) to automatically detect problematic content in the transcript.

13. The non-transitory computer-readable storage medium of claim 9, wherein the notifying includes sending the detected problematic content, as audio data and transcript, stamped with date and time to the mobile application.

14. The non-transitory computer-readable storage medium of claim 9, wherein the computer executable instructions further cause the processor to:

allow the caretaker to perform one or more actions including at least one of: listening to the problematic content, reading the transcript containing problematic content, and calling the user of the electronic device.

15. The non-transitory computer-readable storage medium of claim 9, wherein the blocking includes muting or redacting the voice of the individual.

16. The non-transitory computer-readable storage medium of claim 9, wherein the computer executable instructions further cause the processor to:

enable or disable the automatically blocking step via the mobile application.

17. A system comprising a processor and memory, wherein the processor and the memory in combination are operable to implement a method comprising:

receiving audio data via a headphone worn by a user, wherein the headphone is connected with an electronic device using which the user is in communication with an individual;

transmitting the audio data to a microprocessor of the headphone;

generating transcript of the audio data using speech-to-text algorithm, the speech-to-text algorithm being embedded in the microprocessor;

automatically detecting if the transcript comprises problematic content using an artificial intelligence (AI) content moderating algorithm, the AI content moderating algorithm being embedded in the microprocessor;

wherein upon detecting the problematic content in the transcript:

profiling the voice of the individual delivering problematic content, using audio manipulating algorithm;

based on the profiling, automatically blocking the voice of the individual, using one or more audio processing libraries, when the individual further communicates with the user; and simultaneously notifying a caretaker about the problematic content via a mobile application of a smart device of the caretaker.

18. The system of claim 17, wherein audio data is the audio data of the individual in voice communication with the user, a player in game-related communication with the user, or a video caller in video communication with the user.

19. The system of claim 17, the problematic content includes bullying, cyberbullying, abusive, hate speech, allegations, sexual advances, suicidal ideation and financial frauds.

20. The system of claim 17, wherein the content moderating algorithm invokes a cloud-based content moderating application programming interface (API) to automatically detect problematic content in the transcript.

21. The system of claim 17, wherein the notifying includes sending the detected problematic content, as audio data and transcript, stamped with date and time to the mobile application.

22. The system of claim 17 further comprising allowing the caretaker to perform one or more actions including at least one of: listening to the problematic content, reading the transcript containing problematic content, and calling the user of the electronic device.

23. The system of claim 17, wherein the blocking includes muting or redacting the voice of the individual.

24. The system of claim 17 further comprising enabling or disabling the automatically blocking step via the mobile application.

25. The system of claim 17, the headphone is connected to the electronic device via a smart connector.

* * * * *